United States Patent [19]
Kitamura

[11] 3,759,563
[45] Sept. 18, 1973

[54] MANIPULATOR DEVICE FOR USE WITH INDUSTRIAL ROBOTS

[75] Inventor: Yoshiaki Kitamura, Kamagaya-machi, Japan

[73] Assignee: Kabushiki Kaisha Daini Seikosha, Tokyo, Japan

[22] Filed: Dec. 27, 1971

[21] Appl. No.: 212,552

[30] Foreign Application Priority Data
Dec. 26, 1970  Japan.............................. 45/118894

[52] U.S. Cl................. 294/88, 61/69 R, 214/1 CM, 294/106
[51] Int. Cl........................... B25b 1/18, B63c 11/00
[58] Field of Search........................... 298/88, 106; 61/69 R, 69 A; 114/16 R; 214/1 CM

[56] References Cited
UNITED STATES PATENTS
3,451,224  6/1969  Colechia et al.......................... 61/69
3,236,397  2/1966  Lakin...................................... 214/1

Primary Examiner—Evon C. Blunk
Assistant Examiner—Johnny D. Cherry
Attorney—Robert E. Burns et al.

[57] ABSTRACT

A manipulator device for an industrial robot comprises a gripper mechanism, a reciprocatory motor for actuating the gripper mechanism and a pair of oscillatory motors for effecting angular displacement of the gripper mechanism about two mutually perpendicular axes. The reciprocatory motor and the pair of oscillatory motors are fluid-actuated and a fluid circuit is provided internally of the fluid motors for effecting actuation of each of the fluid motors independently of the operation of the others.

12 Claims, 6 Drawing Figures

MANIPULATOR DEVICE FOR USE WITH INDUSTRIAL ROBOTS

The present invention pertains to a manipulator device for use in automatic machinery and more particularly, to a manipulator device having a high degree of positional accuracy and which is compact and suitable for use in industrial robots.

Manipulator devices are presently being used in industrial robots and such manipulator devices are intended to function much in the same manner as human hands. Unfortunately, the manipulator devices which are currently available have a very restricted degree of movement and therefore have a very limited number of operations which they can perform. Another disadvantage of the conventional manipulator devices is that they are restricted to comparatively simple transfer operations and usually are capable of only transferring an object from one point to another point. Moreover, the currently available manipulator devices are usually either electrically or hydraulically powered and external electrical connections or hydraulic connections are required to actuate the manipulator.

It is therefore a primary object of the present invention to provide a manipulator device capable of performing diverse movements and therefore having a high degree of versatility.

Another object of the present invention is to provide a manipulator device of light-weight and compact construction and which is ideally suited for use in industrial robots.

It is a further object of the present invention to provide a manipulator device capable of gripping an object and angularly displacing the object about two mutually perpendicular axes while effecting angular displacement about each axis independently of the other.

It is a still further object of the present invention to provide a manipulator device which is actuated by compressed air and is therefore operable at high speeds.

It is yet still another object of the present invention to provide a manipulator device which is fluid-actuated and which contains the complete fluid circuit internally of the device so that no external connections are necessary.

The above-mentioned objects are carried out according to the present invention by providing a manipulator device having gripping means for releasably gripping an object, a fluid-actuated reciprocatory motor for actuating the gripping means, and a pair of fluid-actuated oscillatory motors for effecting pivotal movement of the gripping means about two mutually perpendicular axes. Fluid circuit means is provided for supplying and exhausting motor fluid to each of the fluid motors and for effecting actuation of each of the motors independently of the actuation of the other motors.

Having in mind the above and other objects that will be evident from an understanding of this disclosure, the present invention comprises the combination and arrangement of parts illustrated in the preferred embodiment of the invention which is hereinafter set forth in sufficient detail to enable those skilled in the art to readily understand the function, operation and advantages of it when read in conjunction with the accompanying drawings, in which.

Figure 1:
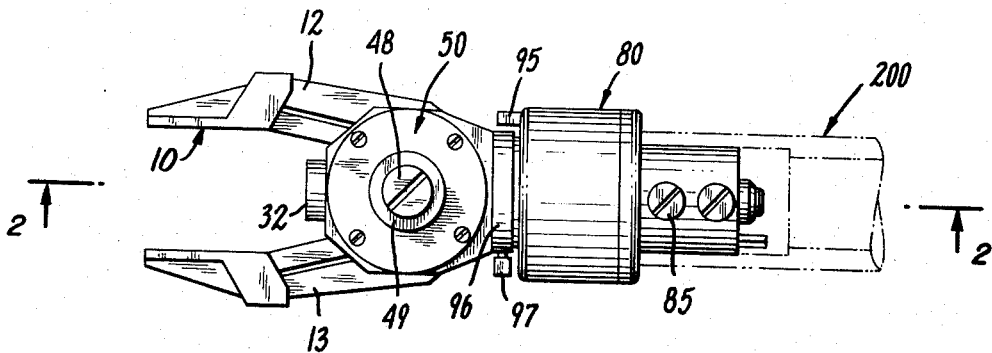
FIG. 1 is a top plan view of a manipulator device according to the present invention.

The manipulator device of the present invention basically comprises a gripper mechanism 10 for releasably gripping an object, a reciprocatory fluid motor 30 operable to actuate the gripping means, and a pair of oscillatory fluid motors 50, 80 operable to oscillate or pivot the gripping means 10 about two mutually orthogonal axes. The manipulator device is connected to an arm 200 of an industrial robot (not shown) and performs various mechanical movements in response to programmed information fed into the robot.

Figure 6:
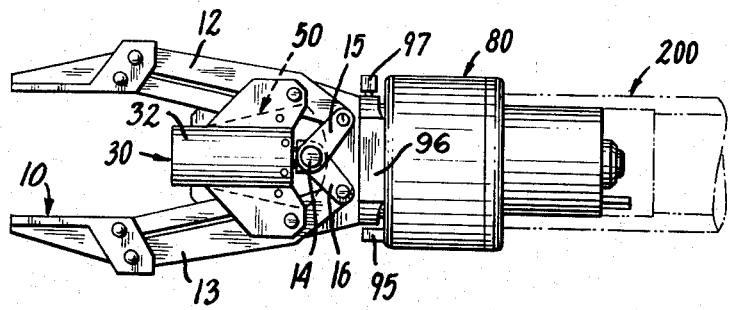
FIG. 6 is a bottom view of the manipulator device shown in FIG. 1.

The gripping means 10 comprises a pair of movable gripping jaws 12, 13 which are mounted in a well known manner for movement towards and away from each other to grip therebetween an object. As seen in FIG. 6, the gripping jaws are mechanically connected together by a linkage system including a link member 15 pivotally coupled at one end to the jaw 12 and another link member 16 pivotally coupled at one end to the jaw 13. The two link members are pivotally connected at their other end to a pin 14 which is connected to the reciprocatory motor 30 whereby the linkage system is actuated by the motor to open and close the jaws in response to reciprocal movement of the fluid motor.

Figure 2:
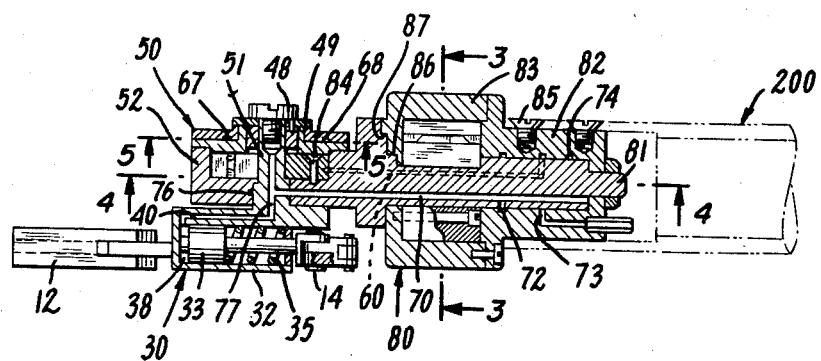
FIG. 2 is a cross-sectional view of the manipulator device shown in FIG. 1 taken along the line II—II.

As most clearly seen in FIG. 2, the reciprocatory motor 30 comprises a cylinder 32 and a working piston 33 mounted for reciprocal movement within the cylinder. The working piston 33 is biased into one end position by a biasing spring 35 and when in this end position, a small clearance 38 is provided between the working face of the piston and the end wall of the cylinder. The clearance is obtained by a small projection on the piston head which abuts against the cylinder end wall thereby maintaining the working face of the piston 33 in spaced-apart relationship from the cylinder end wall.

The working piston 33 has a piston rod 39 connected to the pin 14 of the gripping means 10 whereby reciprocation of the piston accordingly effects opening and closing of the gripper jaws. The working piston is reciprocated in the rightward direction, as seen in FIG. 2, by applying pressurized motive fluid thereto and when the fluid pressure is relieved, the biasing spring 35 effects movement of the piston in the leftward direction to the position shown in FIG. 2. The motive fluid is applied to the working piston by a fluid circuit including a conduit 40 which opens into the clearance 38. The fluid circuit and its mode of operation will be described in detail hereinafter. Thus it may be appreciated that by selectively supplying and exhausting pressurized motive fluid to and from the reciprocatory motor 30, the motor is reciprocally driven to actuate the gripping means 10.

The oscillatory motor 50 is a fluid-actuated vane type oscillatory motor and comprises a shaft 51 pivotally mounted within a housing 52. One end of the shaft 51 is rigidly connected to the cylinder 32 whereupon angular movement of the shaft 51 effects a corresponding angular movement of the reciprocatory motor 30 and hence a similar angular movement of the gripping means 10. The other end of the shaft 51 is pivotally mounted within the housing 52 by means of a screw 48 threaded into the end tip of the shaft and the screw is rotatably mounted on a bushing 49.

Figure 4:
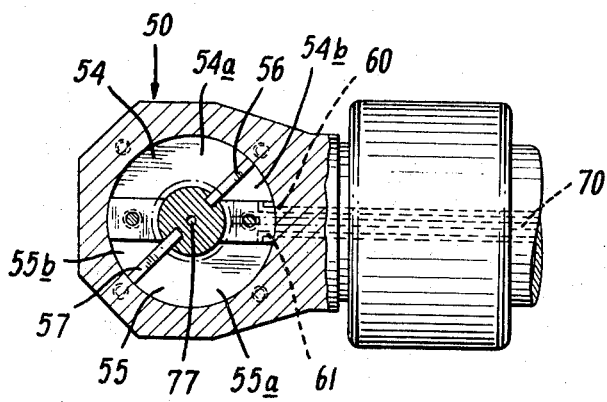
FIG. 4 is a cross-sectional view taken along the line IV—IV in FIG. 2 showing a portion of the other oscillatory motor.

The housing 52 contains therein a pair of arcuate working chambers 54 and 55 as most clearly seen in FIG. 4. A vane 56 is connected to the shaft 51 and extends radially outwardly from the shaft into the chamber 54 dividing the chamber into subchambers 54a and 54b. In a similar manner, another radially extending vane 57 is connected to the shaft 51 in diametrically opposed relationship from the vane 56 and divides the chamber 55 into subchambers 55a and 55b. Each of the vanes extend axially along a portion of the shaft 51 and coact with wall portions of their respective chambers to provide an effective fluid-tight seal between the subchambers during angular movement of the shaft 51.

Figure 3:
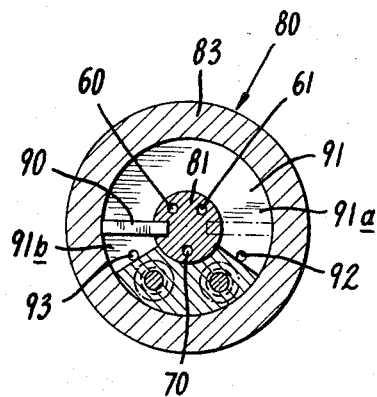
FIG. 3 is a cross-sectional view taken along the line III—III in FIG. 2 showing a portion of one oscillatory motor.

Each vane comprises a pair of overlapping rectangular plates and for the sake of clarity, the vane has been shown as a one piece unit in FIGS. 3 and 4. The two-piece structure of the vanes is shown in FIG. 2 and each vane comprises a first rectangular plate connected to the shaft 51 and a second rectangular plate slidably connected to the first rectangular plate. The second rectangular plate is mounted for radial sliding movement relative to the first rectangular plate and a U-shaped spring is positioned between the two rectangular plates to effectively bias the second plate into sliding contact with the chamber wall. This type of vane construction is well known in the art and does not constitute part of the present invention.

A fluid circuit is provided for supplying and exhausting working fluid to the oscillatory motor 50 and the fluid circuit includes a fluid conduit 60 opening into the subchamber 54b and another fluid conduit 61 opening into the subchamber 55a. In order to actuate the oscillatory motor and effect angular displacement of the shaft 51 about its longitudinal axis in a counterclockwise direction as viewed in FIG. 4, motive fluid is supplied to the conduit 60 and the conduit 61 is opened to exhaust by means of a distributor valve of well known construction (not shown). Pressurized fluid thus flows into the subchamber 54b and acts against one face of the vane 56 to pivot the shaft 51 in a counterclockwise direction while the fluid contained in the subchamber 55a is forced out of the conduit 61 by the counterclockwise movement of the vane 57. The shaft 51 is angularly displaced in a clockwise direction about its axis by reversing the supplying and exhausting of the motive fluid to the conduits 60 and 61 whereupon the vane 57 is actuated by the motive fluid supplied to the subchamber 55a and the fluid contained in the subchamber 54b is exhausted through the conduit 60 due to the clockwise movement of the vane 56.

A fluid bypass system is provided to facilitate the actuation of the oscillatory motor 50 and to increase the driving torque of the driven shaft 51. The fluid bypass system comprises means for interconnecting the subchamber 54b with the subchamber 55b and means for interconnecting the subchamber 54a with the subchamber 55a so that motive fluid is simultaneously applied to both vanes during actuation of the motor and the torque applied to the shaft 51 is therefore double the value of the torque when only one vane is positively driven by the motive fluid.

Figure 5:
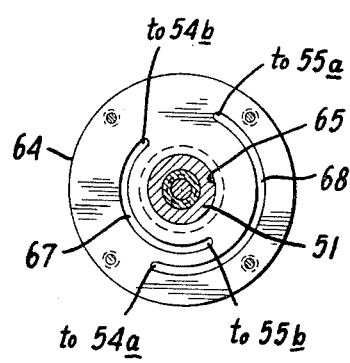
FIG. 5 is a cross-sectional view taken along the line V—V in FIG. 2 of a fluid bypass circuit used with the oscillatory motor shown in FIG. 4.

As seen in FIGS. 2 and 5, the bypass circuit comprises a ring plate 64 superposed above the arcuate chambers 54 and 55. The ring plate has a central opening 65 through which the shaft 51 extends and the ring plate effectively covers the top of the chambers 54 and 55. Within the ring plate 64 is provided a first arcuate groove 67 which opens at one end into the subchamber 54b and at the other end into the subchamber 55b. Another arcuate groove 68 is provided in the ring plate and one end of the groove 68 opens into the subchamber 54a whereas the other end of the groove opens into the subchamber 55a.

By such an arrangement, motive fluid supplied by the conduit 60 into the subchamber 54b is also supplied through the groove 67 into the subchamber 55b to act upon both of the vanes 56 and 57 while both subchambers 54a and 55a are in communication with one another through the groove 68 and are opened to exhaust through the conduit 61.

The oscillatory motor 70 is also a fluid-actuated vane type motor and comprises a shaft 81 mounted for pivotal or oscillatory movement in a support member 82. The support member 82 is connected at one end to a housing 83 and is connected at the other end to an arm 200 of the robot (not shown). The housing 83 and the support member 82 comprise an integral assembly and are connected to the transfer arm 200 by screws 85.

One end portion of the shaft 81 is rigidly connected to the housing 52 of the oscillatory motor 50 and as shown in FIG. 2, the housing 52 actually comprises an extension of the shaft 81. A screw 84 is threaded through a stationary portion of the oscillatory motor 50 into the shaft 81 and by such an arrangement, the oscillatory motor 50 along with the reciprocatory motor 30 and the gripper mechanism 10 are pivotable together as an integral unit with the shaft 81. Thus, any angular displacement of the shaft 81 is accompanied by a corresponding angular displacement of the gripping means 10.

The housing 83 is provided along its upper portion with stepped arcuate guiding surfaces 86 and these stepped surfaces extend along an angular arc defining the locus of angular movement of the shaft 81. The shaft 81 is provided with complementary stepped guiding surfaces 87 which coact with the guiding surfaces 86 to ensure that the shaft 81 is angularly displaced along a constant arcuate path of travel. In other words, the complementary guiding surfaces prevent the movable shaft 81 from moving relative to the housing 83 except for angular displacement along a predetermined arcuate path about its longitudinal axis.

As best seen in FIG. 3, the oscillatory motor 80 includes a vane 90 connected to the shaft 81 and extending radially outwardly therefrom into a working chamber 91 within the housing 83. The vane 90 has substantially the same two-piece construction as the vanes 56, 57 and extends axially along a portion of the shaft 81 coacting with the housing 83 to divide the chamber 91 into subchambers 91a and 91b.

A fluid supply-and-exhaust port 92 opens into the subchamber 91a and a similar supply-and-exhaust port 93 opens into the subchamber 91b. Suitable distributing valve means (not shown) is provided to selectively supply and exhaust motive fluid to the ports 92, 93 to effect actuation of the oscillatory motor. For example, when motive fluid is supplied to the port 93 while the port 92 is opened to exhaust, the motive fluid acts against one working face of the vane 90 to pivot the shaft 81 in a clockwise direction while the other working face of the vane 90 accordingly forces fluid from the chamber 91a out through the exhaust port 92.

The extent of angular displacement of the shaft 81 may be selectively varied by means of a stroke pin 95 extending outwardly from the housing 83 coacting with an adjustable stop member on the shaft 81. The stop member comprises a ring 96 rotatably mounted on the shaft 81 and a threaded set screw 97 threaded into the ring 96 and engageable with the surface of the shaft 81 to releasably lock the ring in place and the head of the set screw 97 is dimensioned to abut against the strike pin 95 thereby limiting the degree of pivotal movement of the shaft 81. A similar arrangement may be provided on the oscillatory motor 50.

The fluid circuit for effecting actuation of the various fluid motors will now be described. A series of fluid conduits are provided for supplying and exhausting motive fluid to and from the fluid motors to actuate each of the motors independently of the other motors. Most of the fluid conduits extend through the shaft 81 and as seen in FIGS. 2 and 3, the conduits 60, 61 and another conduit 70 extend longitudinally through the shaft 81. Each of the conduits 60, 61 abd 70 open into an annular groove provided in the support member 82.

The annular grooves are shown in FIG. 2 and comprise an annular groove 72 in continuous communication with the fluid conduit 70, an annular groove 73 in continuous communication with the fluid conduit 60 and another annular groove 74 in constant communication with the conduit 61. Each of the conduits 60, 61 and 70 have a radially extending portion opening into its respective annular groove and by such a construction, the fluid conduits are maintained in continuous communication with their associated grooves irrespective of the angular position of the shaft 81.

Each of the annular grooves 72, 73 and 74 along with the ports 92 and 93 are connected to a distributor valve (not shown) which distributes the motive fluid to actuate the fluid motors. The distributor valve is of well known construction and functions to selectively supply and exhaust motive fluid, preferably compressed air, to the fluid ports 92 and 93 as well as to the annular grooves 72, 73 and 74.

One end of the conduit 70 terminates in an annular groove 76, as delineated in FIG. 2. A fluid conduit 77 extends longitudinally through the shaft 51 and is connected to the conduit 40. The conduit 77 has a radially extending portion which opens into the annular groove 76 through which the conduit 77 is maintained in constant communication with the annular groove 76 irregardless of the angular disposition of either the shaft 51 or the shaft 81. This construction enables the reciprocatory motor 30 to be controlled independently of either of the oscillatory motors.

The manipulator device operates in the following manner to grip an object in accordance with a predetermined program fed into the robot. The distributor valve is selectively actuated to supply motive fluid to the annular groove 72 whereupon the motive fluid flows serially through the conduit 70, the conduit 77, the conduit 40 and into the clearance 38 to actuate the reciprocatory motor 30. The motive fluid acts against the working face of the piston 33 to drive the piston through a stroke and accordingly actuate the gripper mechanism 10 to close the gripper jaws 12, 13 releasably grip an object.

The distributor valve is operable to selectively apply motive fluid to either the annular groove 73 or 74 while simultaneously opening the other of the annular grooves to exhaust. Assuming that the distributor valve connects the annular groove 73 to the source of motive fluid and the annular groove 74 to exhaust, motive fluid is delivered through the annular groove 73 into the conduit 60 and then into the subchamber 54b of the oscillatory motor 50. Simultaneously with the supplying of motive fluid to the subchamber 54b, the subchamber 55a is open to exhaust through the conduit 61 and the annular groove 74.

The motive fluid supplied to the subchamber 54b is also supplied to the subchamber 55b through the fluid bypass circuit and the subchamber 54a is also connected to the subchamber 55a and therefore to exhaust through the fluid bypass circuit. The motive fluid acts upon the vanes 56 and 57 to pivot the shaft 51 in a counterclockwise direction and the oscillatory movement of the shaft 51 is obtained completely independently of the actuation of both the oscillatory motor 80 and the reciprocatory motor 30.

To pivot the shaft 51 in a clockwise direction, the distributor valve is operated to supply motive fluid to the annular groove 74 while exhausting fluid from the annular groove 73.

The oscillatory motor 80 is actuated by supplying and exhausting motive fluid to the fluid ports 92 and 93. To pivot the shaft 81 in a clockwise direction, the distributor valve is selectively actuated to supply motive fluid to the port 93 while opening the port 92 to exhaust. Motive fluid is therefore fed into the subchamber 91b and coacts with the vane 90 to piviot or angularly displace the shaft 81 in a clockwise direction while the fluid existing in the subchamber 91a is forced out the exhaust port 92.

The shaft 81 is pivoted in a counterclockwise direction by reversing the distribution of motive fluid to the ports 92 and 93 so that motive fluid is supplied to the port 92 and exhausted from the port 93.

The gripper mechanism 10 may be actuated by the reciprocatory motor while the oscillatory motors 50 and 80 are in any position. Similarly, each of the oscillatory motors may be actuated independently of the other as well as independently of the actuation of the reciprocatory motor 30. The oscillatory motor 50 effects oscillating movement of the gripper mechanism 10 about one longitudinally extending axis while the oscillator motor 80 effects oscillating movement of the gripper mechanism 10 about another longitudinally extending axis which is perpendicular to the oscillating axis of the motor 50.

Thus the manipulator device constructed in accordance with the principles of the present invention is ideally suited for use in industrial robots due to its borad versatility of controlled movements. The gripper mechanism is independently pivotable about two orthogonal axes and the gripper mechanism itself is actuatable independently of the oscillatory motors.

Moreover, the manipulator device of the present invention is small in size, constructed of light-weight materials, and is preferably designed to be actuated by compressed air. These features render the manipulator device easily transportable and the manipulator device may be considered a portable device in contrast to the much larger hydraulically powered manipulators currently being used. In addition, the various fluid conduits for actuating the fluid motors are wholly contained interiorly of the manipulator device thereby avoiding the cumbersome and space consuming external arrangement of fluid conduits prevalent in the prior art.

Many modifications of the aforedescribed embodiment will be readily obvious to those skilled in the art and the present invention includes all such modifications falling within the scope and spirit of the invention as defined by the appended claims.

What I claim and desire to secure by letters patent is:

1. A manipulator device for manipulating an object comprising: actuable gripping means for releasably gripping an object during use of the manipulator device; first fluid-actuated means connected to said gripping means and responsive to motive fluid supplied thereto and exhausted therefrom to actuate said gripping means; second fluid-actuated means connected to said gripping means and responsive to releasably gripping an object during use of the manipulator device; first fluid-actuated means connected to said gripping means and responsive to motive fluid supplied thereto and exhausted therefrom to actuate said gripping means, said first fluid-actuated means comprising a reciprocatory motor having a cylinder and a reciprocatory working member reciprocably mounted within said cylinder and connected to said gripping means to actuate same in response to reciprocal movement of said working member; second fluid-actuated means connected to said gripping means responsive to motive fluid supplied thereto and exhausted therefrom to effect angular movement of said gripping means about one axis, said second fluid actuated means comprising an oscillatory motor having a housing, at least one working member mounted for oscillatory movement within said housing, and a movably mounted output member connected to both said working member and cylinder to transmit oscillatory movement of said working member to said cylinder; third fluid-actuated means connected to said gripping means and responsive to motive fluid supplied thereto and exhausted therefrom to effect angular movement of said gripping means about another axis, said third fluid-actuated means comprising another oscillatory motor having another housing, another working member mounted for oscillatory movement within said another housing, and another movably mounted output member connected to both said another working member and said housing of said first-mentioned oscillatory motor to transmit oscillatory movement of said another working member to said housing ; and fluid circuit means connectable to a source of motive fluid for supplying and exhausting motive fluid to and from each of said first, second and third fluid-actuated means to accordingly actuate same.

2. A device according to claim 1; wherein said fluid circuit means includes means for supplying and exhausting motive fluid to and from each said fluid-actuated means independently of the supplying and exhausting of motive fluid to and from the other fluid-actuated means to accordingly effect actuation of said fluid-actuated means independently of the actuation of the other.

3. A device according to claim 1; including means locating said fluid circuit means entirely interiorly of said first, second and third fluid-actuated means.

4. A device according to claim 1; including means connecting said first fluid-actuated means to the output shaft of said second fluid-actuated means to effectively transmit any angular movement of either said second and third fluid-actuated means into a corresponding angular movement of said first fluid-actuated means.

5. A device according to claim 1; including means positioning said one axis perpendicular to said another axis.

6. A device according to claim 1; wherein said fluid circuit means includes means for supplying and exhausting motive fluid to and from each said fluid-actuated means independently of the supplying and exhausting of motive fluid to and from the other fluid-actuated means to accordingly effect actuation of each said fluid-actuated means independently of the actuation of the other.

7. A manipulator device for manipulating an object comprising: actuatable gripping means for releasably gripping an object during use of the manipulator device; first fluid-actuated means connected to said gripping means and responsive to motive fluid supplied thereto and exhausted therefrom to actuate said gripping means, said first fluid-actuated means comprising a reciprocatory motor having a cylinder and a reciprocatory working member reciprocably mounted within said cylinder and connected to said gripping means to actuate same in response to reciprocal movement of said working member; second fluid-actuated means connected to said gripping means responsive to motive fluid supplied thereto and exhausted therefrom to effect angular movement of said gripping means about one axis, said second fluid actuated means comprising an oscillatory motor having a housing, at least one working member mounted for oscillatory movement within said housing, and a movably mounted output member connected to both said working member and cylinder to transmit oscillatory movement of said working member to said cylinder; third fluid-actuated means connected to said gripping means and responsive to motive fluid supplied thereto and exhausted therefrom to effect angular movement of said gripping means about another axis, said third fluid-actuated means comprising another oscillatory motor having another housing, another working member mounted for oscillatory movement within said another housing, and another movably mounted output member connected to both said another working member and said housing of said first-mentioned oscillatory motor to transmit oscillatory movement of said another working member to said housing; and fluid circuit means connectable to a source of motive fluid for supplying and exhausting motive fluid to and from each of said first, second and third fluid-actuated means to accordingly actuate same.

8. A device according to claim 7, including means mounting said output member for oscillatory angular movement about said one axis, and means mounting said another output member for oscillatory angular movement about said another axis perpendicular to said one axis.

9. A device according to claim 7; wherein said fluid circuit means includes means defining a longitudinally extending bore in said output member opening at one end into said cylinder on one side of said reciprocatory working member, means defining a longitudinally extending fluid passage in said another output member, means defining a groove in said another housing connectable to a source of motive fluid and in constant communication with said fluid passage irrespective of the angular movement of said another output member, and means defining another groove in said housing providing constant communication between said bore and fluid passage irrespective of the angular movements of said output member and said another output member, whereby motive fluid may be supplied to and exhausted from said cylinder independently of the angular position of said output member and said another output member.

10. A device according to claim 7; wherein said first-mentioned oscillatory motor comprises a pair of arcuate working chambers and a pair of working members connected to said output member in circumferentially spaced-apart relationship and each mounted for oscillatory movement within one of said arcuate working chambers; and wherein said fluid circuit means includes a fluid bypass circuit operative to simultaneously supply and exhaust motive fluid to and from said pair of arcuate working chambers.

11. A device according to claim 10; wherein said fluid bypass circuit comprises a ring plate having means therein defining a pair of arcuate grooves each communicating one arcuate working chamber with the other on opposite sides of said working members.

12. A device according to claim 7; including means for variably setting the limit of angular movement at least one of said oscillatory motors.

* * * * *